US011025642B1

(12) United States Patent
Jezorek et al.

(10) Patent No.: US 11,025,642 B1
(45) Date of Patent: Jun. 1, 2021

(54) ELECTRONIC MESSAGE AUTHENTICATION

(71) Applicant: Amazon Technologies, Inc., Seattle, WA (US)

(72) Inventors: Matthew Ryan Jezorek, Maple Valley, WA (US); Jason Cetina, Seattle, WA (US); Paul Clarke, Sydney (AU); Douglas Allan Peabody, Bainbridge Island, WA (US); Matthew Michael Sommer, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 15/934,419

(22) Filed: Mar. 23, 2018

(51) Int. Cl.
*H04L 29/06* (2006.01)
*H04L 12/58* (2006.01)
*G06F 21/60* (2013.01)
*H04L 9/08* (2006.01)
*H04L 9/32* (2006.01)

(52) U.S. Cl.
CPC .......... *H04L 63/123* (2013.01); *G06F 21/602* (2013.01); *H04L 9/083* (2013.01); *H04L 9/3242* (2013.01); *H04L 51/30* (2013.01)

(58) Field of Classification Search
CPC .................................................. H04L 63/123
See application file for complete search history.

(56) References Cited

U.S. PATENT DOCUMENTS

| | | | | | |
|---|---|---|---|---|---|
| 2010/0332832 | A1* | 12/2010 | Wu | ...................... | H04L 9/0866 713/169 |
| 2013/0185557 | A1* | 7/2013 | Renganathan | .......... | G06F 21/64 713/168 |
| 2013/0291082 | A1* | 10/2013 | Giladi | ................... | H04L 63/123 726/7 |
| 2014/0082366 | A1* | 3/2014 | Engler | .................. | H04L 9/3226 713/176 |
| 2016/0308851 | A1* | 10/2016 | Tiwari | ................ | H04L 63/0823 |

* cited by examiner

*Primary Examiner* — Simon P Kanaan
(74) *Attorney, Agent, or Firm* — Davis Wright Tremaine LLP

(57) ABSTRACT

An electronic message delivery service receives a request to transmit an electronic message to a recipient. In response to the request, the electronic message delivery service determines first information from the electronic message usable to uniquely identify the electronic message. The electronic message delivery service obtains, based at least in part on the first information and a cryptographic key, cryptographic information that can be inserted into the electronic message. The electronic message delivery service inserts the cryptographic information and second information usable to validate at least a portion of the electronic message with the cryptographic information into the electronic message. The electronic message is transmitted to the recipient.

20 Claims, 8 Drawing Sheets

ELECTRONIC MESSAGE AUTHENTICATION

BACKGROUND

Business entities and other organizations often transmit electronic messages to their customers to provide information regarding, among other things, their accounts, promotional offers, and the like. However, these electronic messages may be mimicked by third parties, which may use these mimicked electronic messages for phishing or to provide false or misleading information to customers. Further, these mimicked electronic messages may be difficult to differentiate from authentic electronic messages from these business entities and other organizations. Thus, customers may become leery of any electronic messages purporting to be from these business entities and other organizations, making it more difficult for these business entities and other organizations to provide relevant information to their customers.

BRIEF DESCRIPTION OF THE DRAWINGS

Various techniques will be described with reference to the drawings, in which.

DETAILED DESCRIPTION

Figure 1:
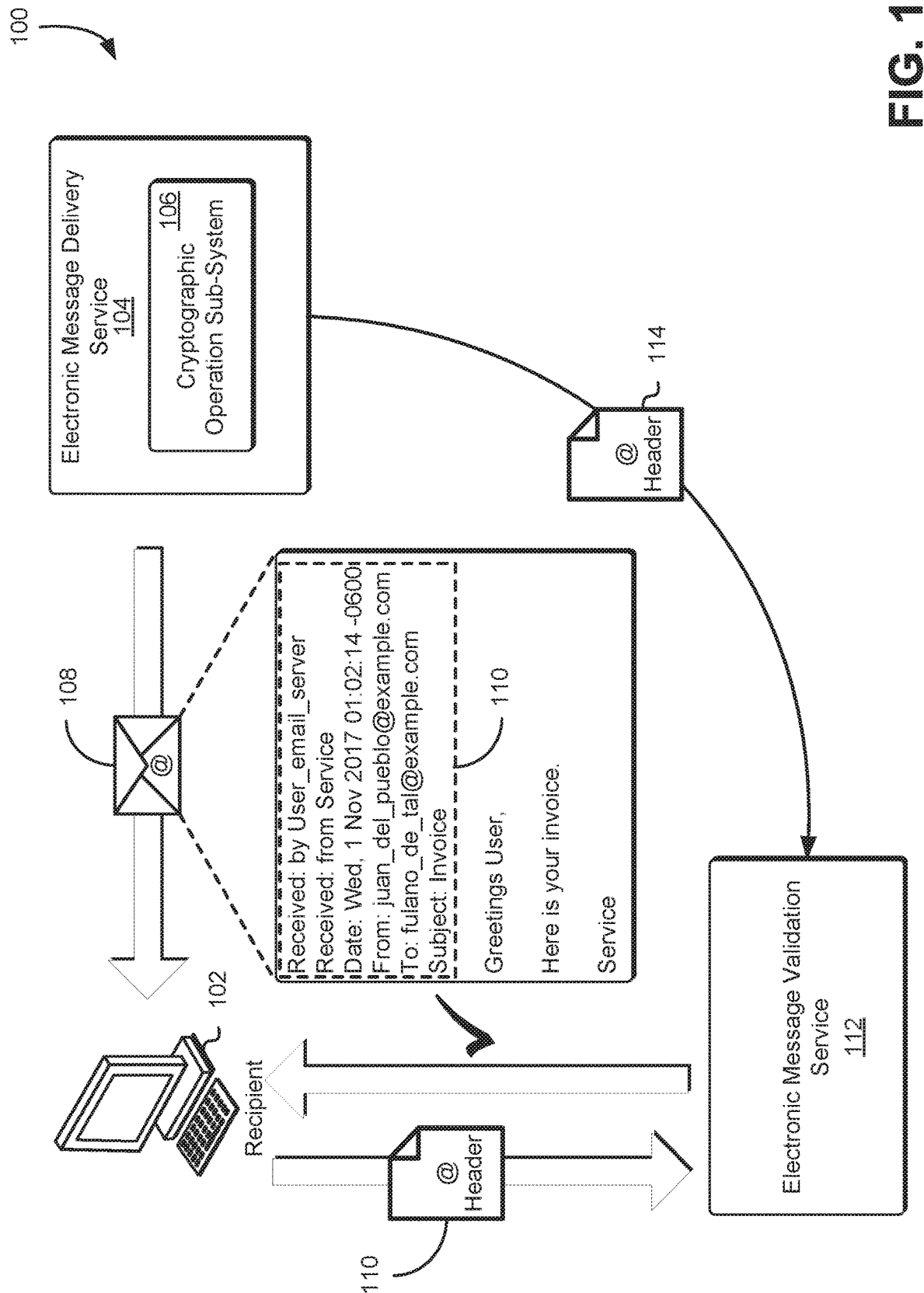
FIG. 1 shows an illustrative example of a system in which various embodiments can be implemented.

Techniques described and suggested herein relate to utilizing cryptographic standards for generating keyed-hash message authentication codes (HMAC) that can be provided in electronic messages for use in validating these electronic messages. In an example, an electronic message delivery service receives a request from an entity to transmit an electronic message to a user. The entity may provide an electronic address of the user, a subject for the electronic message, and other information that may be included in the body of the electronic message. The electronic message may be an e-mail message, a short message service (SMS) message, a multimedia messaging service (MMS) message, and the like. In response to the request, the electronic message delivery service may use the electronic address of the user and the subject for the electronic message as input to a cryptographic hash function to generate an HMAC of the electronic address of the user and the subject for the electronic message that can be included in the electronic message. In an example, the electronic message delivery service utilizes a cryptographic key specific to the user or to the entity that submitted to the request as input to the cryptographic hash function, in addition to the electronic address of the user and the subject for the electronic message, to generate the HMAC. This cryptographic key may be provided by the entity submitting the request or by the electronic message delivery service itself.

In one example, the electronic message delivery service inserts the HMAC into the body of the electronic message and to the header of the electronic message. The electronic message delivery service may also insert, into the body of the electronic message, a notification to the user indicating how the user may utilize the HMAC in the electronic message to validate the electronic message and determine that the electronic message originated from the entity that submitted the request to the electronic message delivery service. In one example, the notification may include instructions for the user to forward the electronic message to an electronic message validation service for validation of the electronic message. For instance, the notification may provide an electronic address to which the user may transmit the received electronic message for validation. In another example, the notification may include a Uniform Resource Identifier (URI) of the electronic message validation service, which the user may utilize to access the electronic message validation service and initiate the process for validating the electronic message.

In an example, in response to receiving the electronic message from a user, the electronic message validation service extracts the electronic address of the user and the subject of the electronic message from the electronic message. Further, the electronic message validation service evaluates the provided electronic message to determine whether it specifies an HMAC or other cryptographic information that can be used to validate the electronic message. In an example, if the electronic message does not include an HMAC or other cryptographic information, the electronic message validation service determines that the electronic message cannot be validated. This may cause the electronic message validation service to transmit a notification to the user to indicate that the electronic message could not be validated. However, if the electronic message includes an HMAC or other cryptographic information, the electronic message validation service may obtain the cryptographic key utilized by the electronic message delivery service to generate the HMAC included in the electronic message transmitted by the electronic message delivery service. The electronic message validation service may use this cryptographic key, the electronic address of the user, and the subject of the electronic message as input to the cryptographic hash function to generate a control HMAC. The electronic message validation service, in an example, compares this control HMAC to the HMAC or other cryptographic information specified in the electronic message to determine whether there is a match. If there is a match, the electronic message validation service may determine that the electronic message has been validated as having been sent by the electronic message delivery service on behalf of the entity. Otherwise, if there is no match, the electronic message validation service may transmit a notification to the user to indicate that the electronic message could not be validated.

In an example, if the electronic message validation service receives, via an interface, a request from the user to validate an electronic message received by the user, the electronic message validation service authenticates the user and obtains the user's electronic address via this authentication process. The electronic message validation service may prompt the user to provide the subject of the electronic message it wants to validate, as well as the HMAC or other cryptographic information specified in the electronic message. In an example, the electronic message validation service obtains the electronic message from the electronic message delivery service instead of prompting the user to provide the subject of the electronic message. Similar to the process described above, the electronic message validation service uses the cryptographic key, the subject of the electronic message, and the electronic address of the user as input to the cryptographic hash function to obtain a control HMAC. If the HMAC or other cryptographic information provided by the user matches the control HMAC generated by the electronic message validation service, the electronic message validation service may transmit a notification to the user to indicate that the electronic message is valid. However, if there is no match, the electronic message validation service may determine that the electronic message received by the user is not valid.

In this manner, a recipient of an electronic message from an entity can determine whether an electronic message purporting to be from a particular entity is valid for use without having to rely on their electronic messaging systems or services for validation of the electronic message. In addition, the techniques described and suggested herein facilitate additional technical advantages. For instance, because a third party to the exchange of the electronic message does not have access to the cryptographic key used to generate the HMAC or other cryptographic information specified in the electronic message, the third party may be unable to validate the electronic message or to mimic electronic messages originating from the electronic message delivery service. Further, if the electronic message validation service determines that a user has received an invalid electronic message that purports to have originated from the electronic message delivery service or from an entity that submitted a request to the electronic message delivery service, the electronic message validation service may perform any remedial actions, including notifying the user to disregard the electronic message. As one skilled in the art will appreciate in light of this disclosure, certain embodiments may be capable of achieving certain advantages, including some or all of the following: improving the security of electronic message transmissions, simplifying the methods available to users to verify the authenticity of electronic messages, and reducing unwanted network traffic through detection of third parties engaged in the dissemination of malicious or misleading electronic messages.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a recipient 102 receives an electronic message 108 from an electronic message delivery service 104. The recipient 102 may be an individual, a group of individuals, or other organizations that may be associated with the author of the electronic message 108 via the author's organization (e.g., service). For example, a recipient 102 of the electronic message 108 may be a purchaser of an item furnished by the organization, whereby the organization may periodically transmit tailored electronic messages that may be specific to the recipient 102.

An electronic message 108 may include an electronic address of the recipient 102. This electronic message address may include an identifier for the name of an electronic mailbox, which may be the username of the recipient 102. Additionally, the electronic message address may specify a domain name that represents an administrative realm for the mailbox. This may correspond to the electronic message delivery service 104 or server utilized by the recipient 102 to access its electronic messages. In some embodiments, the electronic message 108 further includes an electronic address for the author. This electronic address may similarly include the name of an electronic mailbox, which may be the username of the author that is providing the electronic message to the recipient 102. The author's electronic message address may further specify a domain name that corresponds to the author's organization. Thus, the recipient 102 receiving an electronic message with the author's electronic message address may identify the author and the organization to which the author belongs. Electronic messages may include: electronic mail (e-mail) messages, SMS messages, MMS messages, text messages, and other forms of messages that may be delivered electronically.

The electronic message delivery service 104 may include one or more Simple Mail Transfer Protocol (SMTP) servers or other electronic mail servers that may facilitate routing and delivery of electronic messages to customers (e.g., recipient 102 and other users), other services, or other entities based at least in part on the address specified in the electronic message 108. The electronic message delivery service 104 may be a service provided by a computing resource service provider. The electronic message delivery service 104 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. In an embodiment, the electronic message delivery service 104 receives a request from an author to transmit an electronic message 108 to the recipient 102. The electronic message delivery service 104 may provide the author with an interface, such as a graphical user interface (GUI), to enable the author to generate the electronic message 108. For instance, through the interface, the author may specify the electronic address of the recipient 102, the subject of the electronic message 108, and information that is to be included in the body of the electronic message 108. The electronic message delivery service 104 may be provided by a computing resource service provider to its customers, whereby the author may access the electronic message delivery service 104 via a communications network, such as the Internet. Alternatively, the electronic message delivery service 104 may be maintained by an organization of the author or by the author itself. Thus, the electronic message delivery service 104 may be part of an on-premises network of resources of the author's organization.

In an embodiment, the electronic message delivery service 104 includes a cryptographic operation sub-system 106 that generates cryptographic information that is to be included in the electronic message 108 to enable validation of the electronic message 108 by the recipient 102. In an embodiment, the cryptographic operation sub-system 106 is a trusted platform module (TPM) or a hardware security module (HSM) installed on a computer system of the electronic message delivery service 104 that generates cryptographic keys for use in generating the cryptographic information. Further, the TPM/HSM may include executable code for utilizing a cryptographic hash function to generate the cryptographic information. This cryptographic information, in an embodiment, is an HMAC generated using the subject of the electronic message 108, the electronic address of the recipient 102, and a cryptographic key. In an embodiment, the cryptographic operation sub-system 106 obtains the cryptographic key from another service of the computing resource service provider, such as a key management service that generates and maintains cryptographic keys on behalf of its customers upon request. Thus, in some instances, the cryptographic operation sub-system 106 may transmit a request to a key management service to obtain a cryptographic key for use in generating the cryptographic information. Alternatively, the cryptographic operation sub-system 106 may transmit the electronic address of the recipient 102 and the subject of the electronic message 108 to the key management service, which may calculate the cryptographic information using a cryptographic hash function.

It should be noted that while HMACs are used extensively throughout the present disclosure for the purpose of illustration, other cryptographic information may be generated for use in electronic messages. For instance, the cryptographic information may include a digital signature of the electronic message delivery service 104, the key management service, the computing resource service provider, the author, or any other entity authorized to generate digital signatures using a cryptographic key maintained by the entity and verified for use by the electronic message delivery service 104. The cryptographic information may also include a digital certificate generated by a certificate authority on behalf of the cryptographic operation sub-system 106. This certificate authority may be trusted by the recipient 102 and the electronic message validation service 112, which is described in greater detail below. The cryptographic information may utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize HMACs, message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

In an embodiment, the electronic message delivery service 104 intercepts electronic messages sent by a particular author and, via the cryptographic operation sub-system 106, generates the cryptographic information. The cryptographic operation sub-system 106 may insert the cryptographic information into these electronic messages. The electronic message delivery service 104 may transmit the modified electronic messages to their intended recipients. This enables an author to generate electronic messages in a separate service from the electronic message delivery service 104 and transmit the electronic messages to recipients without need to interact with the electronic message delivery service 104 to generate the cryptographic information each time the author generates a new electronic message.

The electronic message delivery service 104 may insert the cryptographic information generated by the cryptographic operation sub-system 106 in the header 110 of the electronic message 108. Alternatively or additionally, the electronic message delivery service 104 may insert the cryptographic information into the body of the electronic message 108. Further, the electronic message delivery service 104 may insert, into the body of the electronic message 108, instructions for the recipient 102 to verify, using the cryptographic information, that the electronic message 108 is from a legitimate source (e.g., the author, the electronic message delivery service 104, etc.). For instance, the electronic message delivery service 104 may provide, in the electronic message 108, a URI of an electronic message validation service 112, which the recipient 102 may access to validate the electronic message 108. Alternatively, the electronic message delivery service 104 may include, in the header 110, a "reply-to" field comprising an electronic address that includes the cryptographic information and a domain of the electronic message validation service 112. Thus, the recipient 102, via a reply to the electronic message 108, may transmit the electronic message 108 and the cryptographic information to the electronic message validation service 112 for validation. In an embodiment, the recipient 102 determines that electronic messages purporting to be from the electronic message validation service 112 in response to providing the electronic message 108 are invalid if received outside of a particular time window defined by the electronic message validation service 112. This time window may initiate once the recipient 102 has transmitted the electronic message 108 to the electronic message validation service 112 via the "reply-to" field.

In an embodiment, the electronic message delivery service 104 inserts, into the body of the electronic message 108, an electronic address of the electronic message validation service 112. To validate the electronic message 108, the recipient 102 may forward the electronic message 108 to the electronic message validation service 112 using the electronic address provided in the electronic message 108. This electronic address may be similar to the electronic address described above, whereby the electronic address may include the cryptographic information. Further, the electronic address may include an identifier of the cryptographic key utilized to generate the cryptographic information, as well as information about the recipient 102 that can be used by the electronic message validation service 112 to validate the electronic message 108.

In an embodiment, the electronic message delivery service 104 inserts executable code into the electronic message 108 that, if executed by a computer system of the recipient 102, causes the computer system to initiate the validation process for the electronic message 108. For instance, if the recipient 102 opens the electronic message 108, the executable code may cause the recipient's computer system to forward the electronic message 108 to the electronic message validation service 112 for validation of the electronic message 108. Alternatively, the executable code may cause the computing device to access an interface of the electronic message validation service 112, which may be presented to the recipient 102 via a GUI. Through the GUI, the recipient 102 may interact with the electronic message validation service 112 to enable validation of the electronic message 108.

The electronic message validation service 112 may comprise one or more computer systems of the electronic message delivery service 104 that perform executable instructions for validating electronic messages from various recipients. The electronic message validation service 112 may be maintained by the author of the electronic message 108 or an organization of the author in an on-premises network of the organization. Alternatively, the electronic message validation service 112 may be provided by a computing resource service provider or other service provider that provides its services to its customers over a communications network, such as the Internet. It should be noted that while the electronic message validation service 112 is represented, in FIG. 1, as a distinct service, the electronic message validation service 112 may function as a sub-system of the electronic message delivery service 104. For instance, the electronic message validation service 112 may be a computer system, application, or process of the electronic message delivery service 104.

If the electronic message delivery service 104 includes, in the electronic message 108, an electronic address of the electronic message validation service 112, the recipient 102 may transmit, using the electronic address supplied in the electronic message 108, the electronic message 108 to the electronic message validation service 112. In an embodiment, in response to receiving the electronic message 108, the electronic message validation service 112 extracts, from the electronic message 108, the cryptographic information, as well as the information in the electronic message 108 utilized to create the cryptographic information. For example, if the cryptographic information is generated using the electronic address of the recipient 102 and the subject of the electronic message 108, the electronic message validation service 112 may extract the electronic address of the recipient 102 and the subject of the electronic message 108 from the electronic message 108. In some instances, the electronic message validation service 112 may transmit a request to the electronic message delivery service 104 or to the entity that generated the cryptographic information to determine what information from the electronic message 108 was utilized to generate the cryptographic information.

In an embodiment, if the header 110 of the electronic message 108 includes a field that specifies an identifier of the cryptographic key used to generate the cryptographic information, the electronic message validation service 112 may query the electronic message delivery service 104 or another entity that maintains the cryptographic keys to determine whether the cryptographic key is available for use. If no cryptographic key is available corresponding to the identifier obtained by the electronic message validation service 112, the electronic message validation service 112 may determine that the electronic message 108 is not valid. The electronic message validation service 112 may transmit a notification to the recipient 102 to indicate that the electronic message 108 could not be validated. Further, in some embodiments, the electronic message validation service 112 may transmit a notification to a security service to cause the security service to perform one or more remedial actions to address the delivery of invalid electronic messages that may be mimicking legitimate electronic messages from the author or from the electronic message delivery service 104.

If the electronic message validation service 112 identifies the cryptographic key used to generate the cryptographic information in the electronic message 108, the electronic message validation service 112 may use the information from the electronic message 108 used to generate the cryptographic information and the cryptographic key to generate control cryptographic information. The control cryptographic information may correspond to the expected cryptographic information that is to be included in the electronic message 108 by the electronic message delivery service 104 or the author. The electronic message validation service 112 may compare the control cryptographic information to the cryptographic information specified in the electronic message 108 to determine whether these match. If there is a match, the electronic message validation service 112 may determine that the electronic message 108 is valid and originated from a trusted source (e.g., the electronic message delivery service 104, the author, etc.). If the electronic message 108 is valid, the electronic message validation service 112 may transmit a notification to the recipient 102 to indicate that the electronic message 108 did originate from the electronic message delivery service 104, from the author, or from any trusted entity that generated the electronic message 108. However, if the electronic message validation service 112 determines that there is no match between the control cryptographic information and the cryptographic information specified in the electronic message 108, the electronic message validation service 112 may transmit a notification to a security service to cause the security service to perform one or more remedial actions to address the delivery of invalid electronic messages, as described above.

In an embodiment, if the electronic message delivery service 104 includes, in the electronic message 108, a URI of the electronic message validation service 112, the electronic message validation service 112 can receive a request from the recipient 102 to validate the electronic message 108 without the recipient 102 having to transmit the entire electronic message 108 to the electronic message validation service 112. For instance, the URI may direct the recipient 102 to an interface of the electronic message validation service 112. Through the interface, the electronic message validation service 112 may prompt the recipient 102 to provide its electronic address or other information that may be used to identify the electronic message 108. The electronic message validation service 112 may prompt the recipient 102, via the interface, to provide the cryptographic information from the electronic message 108. Further, if the electronic message validation service 112 does not have access to the electronic message transmitted by the electronic message delivery service 104 to the recipient 102, the electronic message validation service 112 may prompt the recipient 102 to provide the header 110 of the electronic message 108 or other information used to generate the cryptographic information. In some embodiments, the URI includes the HMAC and other information usable by the electronic message validation service 112 to identify the electronic message 108 and to validate the electronic message 108. This other information may include an identifier of the cryptographic key, the recipient's electronic address, an indication of the portion of the electronic message 108 used to create the cryptographic information, and the like.

If the electronic message delivery service 104 maintains a log of electronic messages transmitted to the recipient 102, the electronic message validation service 112 may transmit a request to the electronic message delivery service 104 to obtain the header 114 or other information of the electronic message transmitted to the recipient 102 used to generate the cryptographic information. Further, the electronic message validation service 112 may submit a request to the electronic message delivery service 104 or to another entity that maintains the cryptographic keys for use in creating cryptographic information (e.g., key management service, TPM/HSM of the electronic message delivery service 104, cryptographic key database, etc.) to obtain the cryptographic key utilized to generate the cryptographic information inserted into the electronic message 108. In some instances, if the electronic message validation service 112 is not authorized to obtain the cryptographic key, the electronic message validation service 112 may provide the information from the header 110 to the service or computer system that maintains the cryptographic key to calculate control cryptographic information that should correspond to the expected cryptographic information inserted into the electronic message 108. The electronic message validation service 112 may compare the control cryptographic information to the cryptographic information provided by the recipient 102 via the interface to determine if they match. If there is a match, the electronic message validation service 112 may determine that the electronic message 108 is valid and update the interface to indicate that the electronic message is valid 108. Alternatively, if the cryptographic information provided by the recipient 102 does not match the control cryptographic information, the electronic message validation service 112 may update the interface to indicate that the electronic message 108 could not be validated. Further, the electronic message validation service 112 may perform one or more remedial actions, such as transmitting a notification to a security service to indicate an invalid electronic message has been received by a recipient 102.

Figure 2:
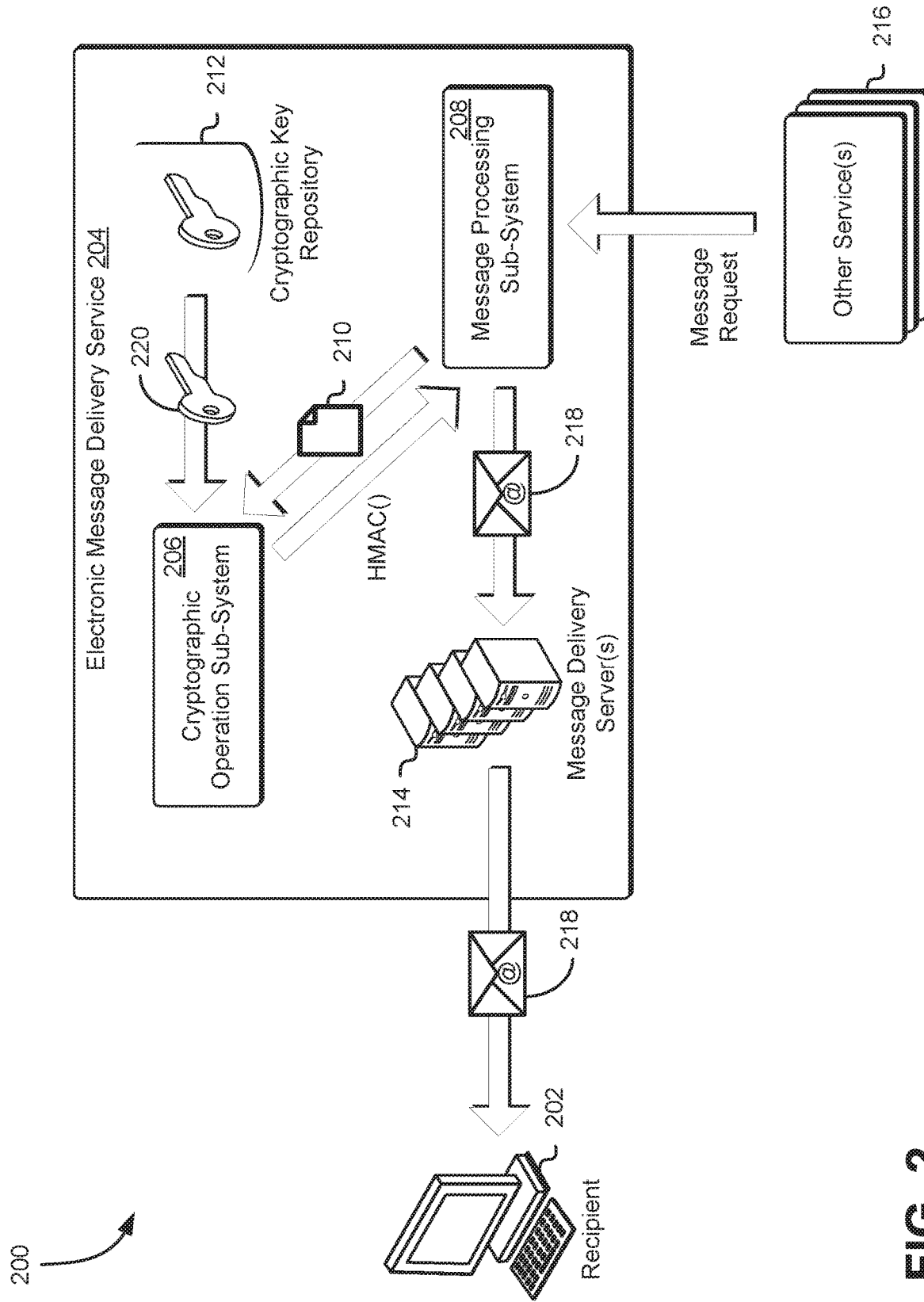
FIG. 2 shows an illustrative example of a system in which an electronic message delivery service generates a unique cryptographic code that is inserted into an electronic message to enable validation of the electronic message in accordance with at least one embodiment.

As noted above, an author of an electronic message may transmit a request to an electronic message delivery service to add cryptographic information to the electronic message that can be used by a recipient to verify that the electronic message originated from the author or from the electronic message delivery service. Accordingly, FIG. 2 shows an illustrative example of a system 200 in which an electronic message delivery service 204 generates a unique cryptographic code that is inserted into an electronic message 218 to enable validation of the electronic message 218 in accordance with at least one embodiment. In the system 200, the electronic message delivery service 204 includes a message processing sub-system 208, which may process incoming requests from other services 216, an author, an organization, or any other entity that wants to transmit an electronic message to a particular recipient 202 or set of recipients. The other services 216 can include services provided by a computing resource service provider that also provides the electronic message delivery service 204 to customers of the computing resource service provider. For instance, a service may utilize the electronic message delivery service 204 to transmit electronic messages to customers detailing resource usage or issues with their accounts.

The message processing sub-system 208 may be a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. In an embodiment, the message processing sub-system 208 receives a request from another service 216 or any other entity authorized to access the electronic message delivery service 204, to transmit an electronic message 218 to a particular recipient 202. The request may specify various elements of the electronic message 218, such as a header comprising an electronic address of the recipient 202, the electronic address of the author of the electronic message 218, a subject of the electronic message 218, information for the recipient 202 specified in the body of the electronic message 218, and the like. In some instances, the message processing sub-system 208 may provide functionality (e.g., a GUI) to enable users to generate the electronic message 218.

In an embodiment, the message processing sub-system 208 determines whether the electronic message 218 is to include cryptographic information, such as an HMAC, that can be used by the recipient 202 to validate the electronic message 218. For instance, via an interface, the other service 216 or author of the electronic message 218 may specify that information is to be included in the electronic message 218 that can be used by the recipient 202 to validate the electronic message 218. If the message processing sub-system 208 determines that the electronic message 218 is not to include this validation information, the message processing sub-system 208 may cause one or more message delivery servers 214 to transmit the electronic message 218 to the recipient 202. The one or more message delivery servers 214 may include one or more SMTP servers or other electronic mail servers that may facilitate routing and delivery of electronic messages to customers (e.g., recipient 202 and other users), other services, or other entities based at least in part on the electronic address specified in the electronic message 218. It should be noted that while the message delivery servers 214 are represented, in FIG. 2, as being within the ambit of the electronic message delivery service 204, the message delivery servers 214 may be maintained separately from the electronic message delivery service 204 as stand-alone entities.

If the message processing sub-system 208 determines that the electronic message 218 is to include cryptographic information usable by the recipient 202 to validate the electronic message 218, the message processing sub-system 208 may transmit a request to a cryptographic operation sub-system 206 to generate the cryptographic information. The cryptographic operation sub-system 206 may be similar to the cryptographic operation sub-system 106 described above in connection with FIG. 1. In its request, the message processing sub-system 208 may provide unencrypted information 210 that is to serve as input for a cryptographic hash function to generate the cryptographic information. For example, the unencrypted information 210 may include the electronic address of the recipient 202 and the subject of the electronic message 218. Alternatively, the unencrypted information 210 may include a portion of the body of the electronic message 218.

In response to the request from the message processing sub-system 208, the cryptographic operation sub-system 206 obtains a cryptographic key 220 usable in conjunction with the unencrypted information 210 as input to a cryptographic hash function to generate the cryptographic information to be included in the electronic message 218. In an embodiment, the cryptographic operation sub-system 206 obtains the cryptographic key 220 from a cryptographic key repository 212 of the electronic message delivery service 204. The cryptographic key repository 212 may be a database that maintains cryptographic keys per customer of the electronic message delivery service 204. Alternatively, the cryptographic key repository 212 may maintain a cryptographic key for each recipient of electronic messages transmitted via the electronic message delivery service 204. In some instances, the cryptographic key repository 212 may maintain a cryptographic key 220 to be utilized for a period of time for all recipients and customers, such that the cryptographic key 220 is subject to rotation once the period of time has elapsed. As noted above, the cryptographic operation sub-system 206 may be a TPM/HSM that generates and maintains cryptographic keys. This may obviate the need to maintain a cryptographic key repository 212. It should also be noted that the cryptographic key repository 212 may be maintained by another service, such as a key management service. In an embodiment, the cryptographic key 220 is provided to the cryptographic operation sub-system 206 by the other service 216 or author of the electronic message 218.

In an embodiment, the cryptographic operation sub-system 206 uses the cryptographic key 220 and the unencrypted information 210 from the message processing sub-system 208 as input to a cryptographic hash function to generate an HMAC. The cryptographic operation sub-system 206 may provide the HMAC to the message processing sub-system 208 for inclusion in the electronic message 218. The cryptographic operation sub-system 206 may also provide an electronic address of an electronic message validation service that can verify the cryptographic information (e.g., HMAC). In an embodiment, the electronic address of the electronic message validation service includes an identifier of the cryptographic key 220 utilized to generate the cryptographic information, as well as the cryptographic information itself. The message processing sub-system 208 may add this electronic address to the header of the electronic message 218 in a "reply-to" field of the header. Alternatively, the message processing sub-system 208 may add the electronic address to the body of the electronic message 218, along with instructions that the recipient 202 may utilize to forward the electronic message 218 to the electronic message validation service for validation of the electronic message 218.

The message processing sub-system 208 may also insert the cryptographic information from the cryptographic operation sub-system 206 into the header of the electronic message 218 and to the body of the electronic message 218. Further, the message processing sub-system 208 may include instructions in the electronic message 218 to enable the recipient 202 to validate the electronic message 218. For example, the message processing sub-system 208 may include a URI of the electronic message validation service, which the recipient 202 may use to access the electronic message validation service to provide the cryptographic information and other information usable by the electronic message validation service to validate the electronic message 218. Alternatively, the message processing sub-system 208 may include an electronic address of the electronic message validation service, as described above. This may enable the recipient 202 to transmit the electronic message 218 to the electronic message validation service via the electronic address provided in the electronic message 218.

Figure 3:
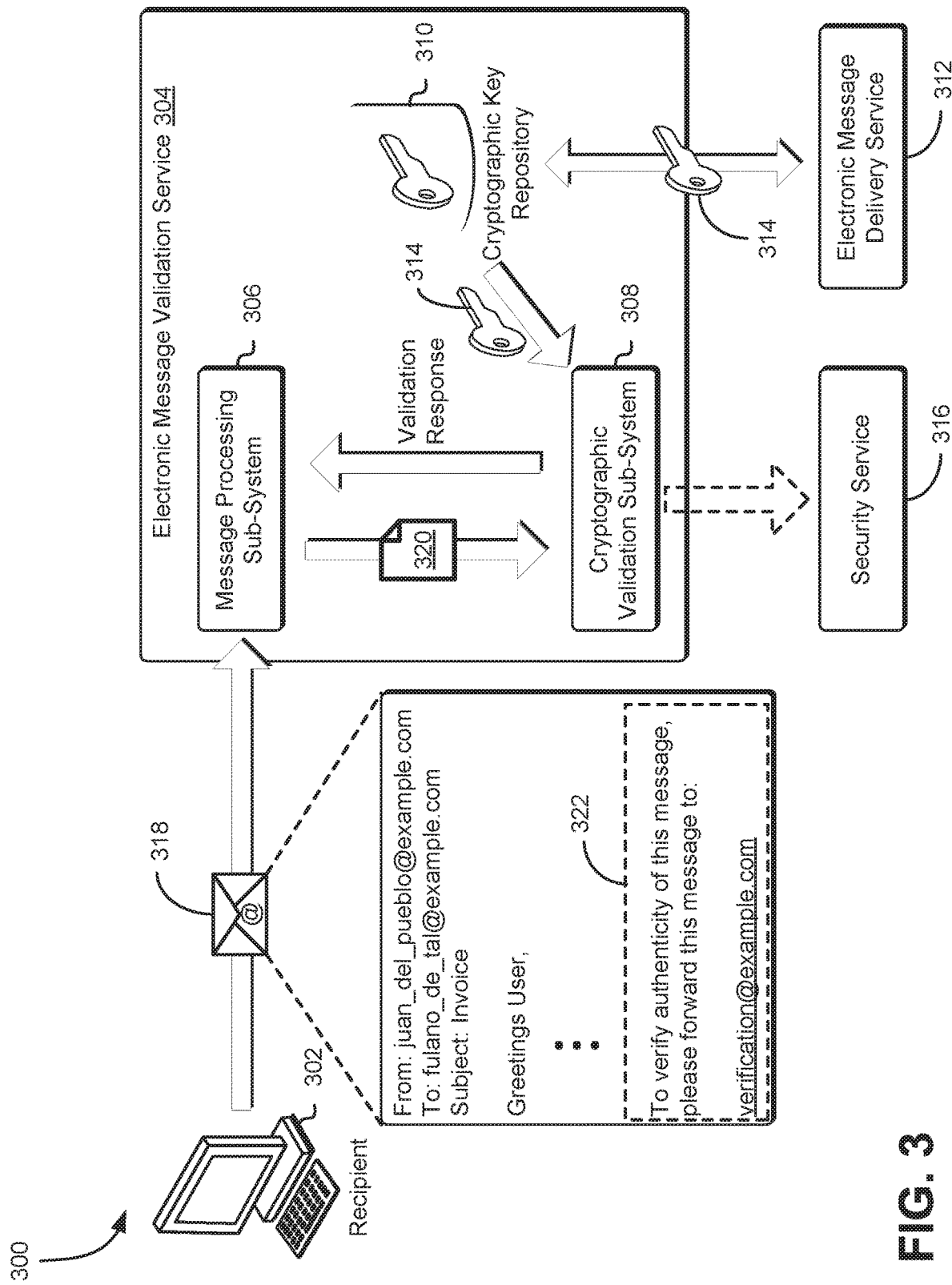
FIG. 3 shows an illustrative example of a system in which a recipient of an electronic message transmits the electronic message to an electronic message validation service for validation of the electronic message in accordance with at least one embodiment.

As noted above, the message processing sub-system of the electronic message delivery service may insert an electronic address of an electronic message validation service into the body of an electronic message to enable a recipient of the electronic message to transmit the electronic message to the electronic message validation service for validation. This electronic address may include the cryptographic information generated by the cryptographic operation sub-system, as well as an identifier corresponding to the cryptographic key utilized to generate the cryptographic information. The electronic message validation service may utilize this information to determine whether the cryptographic information is valid. Accordingly, FIG. 3 shows an illustrative example of a system 300 in which a recipient 302 of an electronic message 318 transmits the electronic message 318 to an electronic message validation service 304 for validation of the electronic message 318 in accordance with at least one embodiment.

In the system 300, the recipient 302 receives an electronic message 318 from an electronic message delivery service or some other entity. The electronic message 318 may include instructions 322 for the recipient 302 to forward the electronic message 318 to an electronic message validation service 304 for validation. The instructions 322 may include an electronic address of the electronic message validation service 304. In an embodiment, the electronic address includes the cryptographic information and an identifier corresponding to a cryptographic key 314 used to generate the cryptographic information. For example, the electronic address may include a plus sign in addition to the name of the electronic mailbox of the electronic message validation service 304. The information included after the plus sign and prior to the domain may include the cryptographic information and the identifier of the cryptographic key 314. Thus, the electronic message 318 may be provided to the electronic message validation service 304 with the cryptographic information and identifier of the cryptographic key 314 in the response from the recipient 302.

The electronic message validation service 304 may include a message processing sub-system 306, which may receive the electronic message 318 from the recipient 302. Similar to the message processing sub-system 208 described above, the message processing sub-system 306 may be a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The message processing sub-system 306 may extract the cryptographic information from the electronic message 318 or from the electronic address utilized by the recipient 302 to transmit the electronic message 318 to the electronic message validation service 304. Further, the message processing sub-system 306 may extract, from the electronic message 318, the information utilized by the electronic message delivery service to generate the cryptographic information. For instance, the message processing sub-system 306 may extract the subject of the electronic message 318 and the electronic address of the recipient 302, if these were used to generate the cryptographic information.

The message processing sub-system 306 may transmit the information 320 usable by a cryptographic validation sub-system 308 of the electronic message validation service 304 to validate the electronic message 318. The cryptographic validation sub-system 308 may be a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. In an embodiment, the cryptographic validation sub-system 308 is the cryptographic operation sub-system 206 of the electronic message delivery service 204 described above in connection with FIG. 2. Thus, the cryptographic validation sub-system 308, while represented in FIG. 3 as being a sub-system of the electronic message validation service 304, may be a system separated from the electronic message validation service 304.

In an embodiment, the cryptographic validation sub-system 308 obtains a cryptographic key 314 corresponding to the cryptographic key identifier obtained from the electronic message 318. For instance, the cryptographic validation sub-system 308 may query a cryptographic key repository 310 to determine whether a cryptographic key 314 corresponding to the provided cryptographic key identifier is available for use. In some instances, the cryptographic key repository 310 may be the same cryptographic key repository 212 described above in connection with FIG. 2. Alternatively, the cryptographic key repository 310 may be updated to include the cryptographic keys maintained by the cryptographic key repository of the electronic message delivery service 312. In an embodiment, if the cryptographic key repository 310 does not maintain a cryptographic key 314 corresponding to the identifier specified in the electronic message 318, the cryptographic validation sub-system 308 causes the cryptographic key repository 310 to query the electronic message delivery service 312 to determine if the cryptographic key 314 is available. If the cryptographic key 314 is available, the cryptographic key repository 310 may obtain the cryptographic key 314. Alternatively, the cryptographic key repository 310 may provide a response indicating that the cryptographic key 314 is available from the electronic message delivery service 312 or from another entity (e.g., a key management service, the author of the electronic message 318, etc.).

If the cryptographic validation sub-system 308 does not identify a cryptographic key 314 corresponding to the identifier provided in the electronic message 318 or that otherwise was used to generate the cryptographic information, the cryptographic validation sub-system 308 may transmit a response to the message processing sub-system 306 to indicate that the electronic message 318 cannot be validated. This may cause the message processing sub-system 306 to transmit a notification to the recipient 302 that the electronic message 318 could not be validated. Further, the message processing sub-system 306 may specify, in the notification, remedial actions that may be performed by the recipient 302 to address the invalid electronic message. For instance, the message processing sub-system 306 may instruct the recipient 302 to discard the electronic message 318 or to ignore the information included therein. In addition to providing this validation response, the cryptographic validation sub-system 308 may transmit a notification to a security service 316 to indicate that an invalid electronic message has been received by a recipient 302. This may cause the security service 316 to perform one or more remedial actions itself, such as evaluating the electronic message 318 to identify any hallmarks of a third-party entity that may have created the electronic message 318.

If the cryptographic validation sub-system 308 obtains the cryptographic key 314 from the cryptographic key repository 310, the cryptographic validation sub-system 308 may use the cryptographic key 314 and the unencrypted information extracted from the electronic message 318 as input to a cryptographic hash function to generate control cryptographic information. This control cryptographic information may correspond to the expected cryptographic information that should be included in the electronic message 318 if the electronic message 318 was transmitted from a legitimate source (e.g., the electronic message delivery service 312, the author of the electronic message 318, etc.). The cryptographic validation sub-system 308 may compare the control cryptographic information to the cryptographic information extracted from the electronic message 318 to determine whether there is a match. If the cryptographic information extracted from the electronic message 318 does not match the control cryptographic information, the cryptographic validation sub-system 308 may determine that the electronic message 318 is invalid and may perform the operations described above for the absence of the cryptographic key 314. However, if the cryptographic information extracted from the electronic message 318 does match the control cryptographic information, the cryptographic validation sub-system may determine that the electronic message 318 is authentic and valid. The cryptographic validation sub-system 308 may transmit, via the message processing sub-system 306, a notification to the recipient 302 to indicate that the electronic message 318 is valid.

Figure 4:
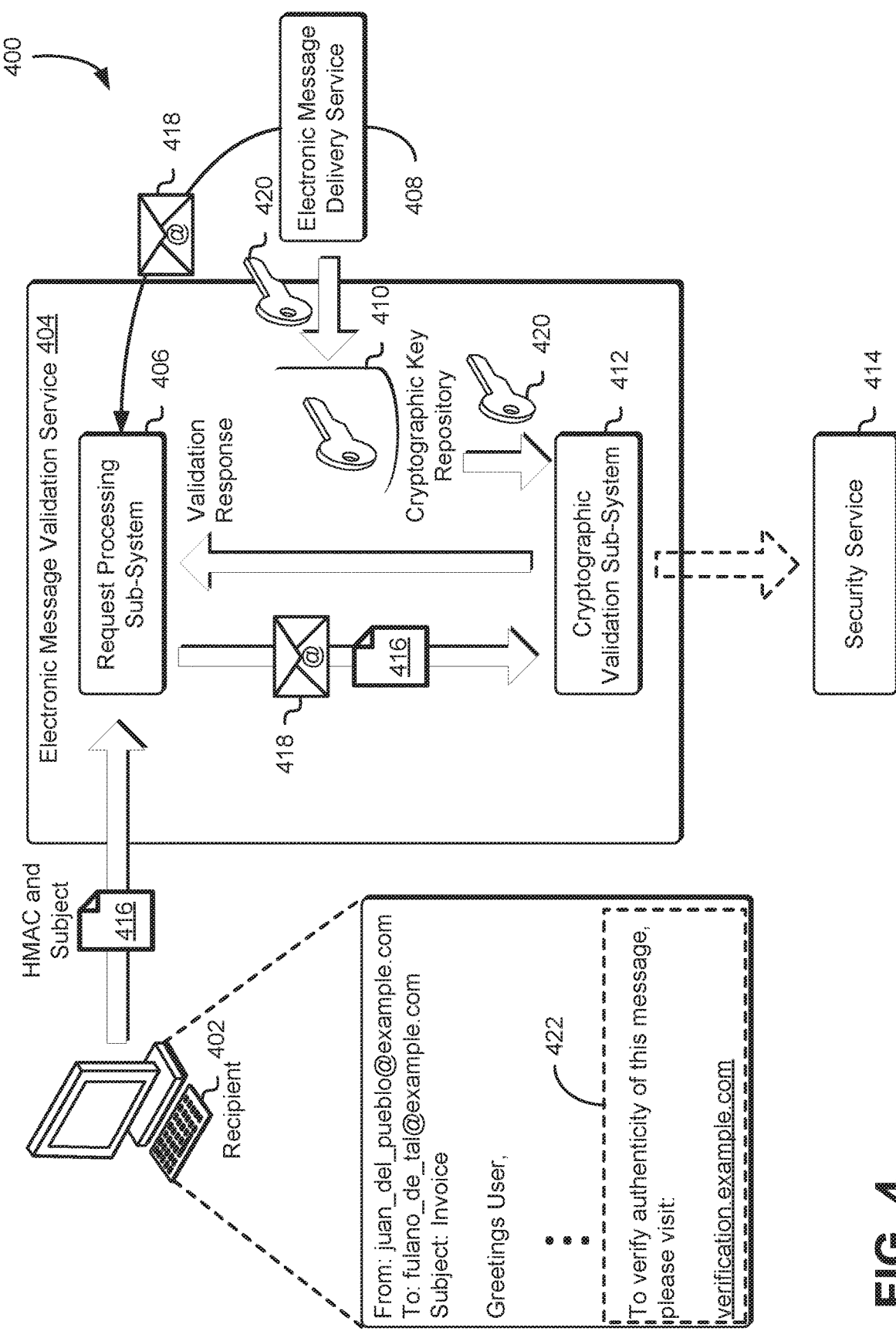
FIG. 4 shows an illustrative example of a system in which a recipient of an electronic message provides a cryptographic code from an electronic message and information from the electronic message to an electronic message validation service for validation of the electronic message in accordance with at least one embodiment.

As noted above, the electronic message delivery service may include, in the electronic message to the recipient, a URI of the electronic message validation service, as well as instructions for accessing the electronic message validation service to validate the electronic message. Through use of the URI, the recipient may access an interface of the electronic message validation service to provide the cryptographic information from the electronic message, as well as other information that can be used by the electronic message validation service to determine whether the electronic message can be validated. This option may be provided as an alternative to having the recipient provide the entire electronic message to the electronic message validation service, thereby reducing the bandwidth usable for validating an electronic message. Accordingly, FIG. 4 shows an illustrative example of a system 400 in which a recipient 402 of an electronic message 418 provides a cryptographic code from an electronic message 418 and information from the electronic message 418 to an electronic message validation service 404 for validation of the electronic message 418 in accordance with at least one embodiment.

In the system 400, the recipient 402 may receive an electronic message 418 from an electronic message delivery service 408 or from another entity (e.g., the author of the electronic message 418, a third party, etc.). The electronic message 418 may include instructions 422 for the recipient 402 to access an electronic message validation service 404 for validation of the electronic message 418. The instructions 422 may include a URI for an interface of the electronic message validation service 404. If the recipient 402 selects the URI from the electronic message 418, the recipient 402 may be directed to an interface of the electronic message validation service 404. This interface may be provided by a request processing sub-system 406 of the electronic message validation service 404. The request processing sub-system 406 may be a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

The request processing sub-system 406, via the interface, may prompt the recipient 402 to provide authentication information usable to verify the identity of the recipient 402. The authentication information may include a username of the recipient 402, as well as other credential information including, but not limited to: a password, a hash of a password, a unique one-time password, a response to a personal question (e.g., mother's maiden name, etc.), and the like. The request processing sub-system 406 may evaluate the authentication information provided by the recipient 402 to determine whether the recipient 402 can be authenticated. If the recipient 402 cannot be authenticated, the request processing sub-system 406 may indicate, via the interface, that the recipient 402 has not been authenticated and, thus, cannot have its electronic message 418 validated.

If the request processing sub-system 406 determines that the recipient 402 has been authenticated successfully, the request processing sub-system 406 may transmit, via the interface, a request to the recipient 402 to provide information 416 from the electronic message 418. This information 416 may include the cryptographic information from the electronic message 418, as well as the information in the electronic message 418 that was used to generate the cryptographic information. In an embodiment, the request processing sub-system 406 obtains the electronic message 418 transmitted by the electronic message delivery service 408. For instance, the request processing sub-system 406 may query, using the electronic address or other username of the recipient 402, the electronic message delivery service 408 to identify and obtain the electronic message 418. This may obviate the need for the recipient 402 to provide information other than the cryptographic information from the electronic message 418.

The request processing sub-system 406 may provide the information 416 provided by the recipient 402, as well as the electronic message 418 (if available from the electronic message delivery service 408) to the cryptographic validation sub-system 412 for evaluation. The cryptographic validation sub-system 412 may be identical to the cryptographic validation sub-system 308 described above in connection with FIG. 3. Additionally, the cryptographic validation sub-system 412 may perform a similar process to that performed by the cryptographic validation sub-system 308 described above to obtain a cryptographic key 420 for generating the control cryptographic information. For instance, the cryptographic validation sub-system 412 may query a cryptographic key repository 410 to determine whether a cryptographic key 420 corresponding to the provided cryptographic key identifier is available for use. In an embodiment, if the cryptographic key repository 410 does not maintain a cryptographic key 420 corresponding to the identifier specified in the electronic message 418, the cryptographic validation sub-system 412 causes the cryptographic key repository 410 to query the electronic message delivery service 408 to determine if the cryptographic key 420 is available. If the cryptographic key 420 is available, the cryptographic key repository 410 may obtain the cryptographic key 420. Alternatively, the cryptographic key repository 410 may provide a response indicating that the cryptographic key 420 is available from the electronic message delivery service 408 or from another entity.

If the cryptographic validation sub-system 412 does not identify a cryptographic key 420 corresponding to the identifier provided in the electronic message 418 or that otherwise was used to generate the cryptographic information, the cryptographic validation sub-system 412 may transmit a response to the request processing sub-system 406 to indicate that the electronic message 418 cannot be validated. This may cause the request processing sub-system 406 to transmit a notification, via the interface, to the recipient 402 that the electronic message 418 could not be validated. In addition to providing this validation response, the cryptographic validation sub-system 412 may transmit a notification to a security service 414 to indicate that an invalid electronic message has been received by a recipient 402.

If the cryptographic validation sub-system 412 obtains the cryptographic key 420 from the cryptographic key repository 410, the cryptographic validation sub-system 412 may use the cryptographic key 420 and the unencrypted information provided in the information 416 from the recipient 402 as input to a cryptographic hash function to generate control cryptographic information. Alternatively, if the cryptographic validation sub-system 412 obtains the electronic message 418 from the electronic message delivery service 408, the cryptographic validation sub-system 412 may extract the unencrypted information from the electronic message 418 to use in conjunction with the cryptographic key 420 to generate the control cryptographic information.

The cryptographic validation sub-system 412 may compare the control cryptographic information to the cryptographic information provided by the recipient 402 to determine whether there is a match. If the cryptographic information provided by the recipient 402 does not match the control cryptographic information, the cryptographic validation sub-system 412 may determine that the electronic message 418 received by the recipient 402 is invalid and may perform the operations described above for the absence of the cryptographic key 420. However, if the cryptographic information provided by the recipient 402 does match the control cryptographic information, the cryptographic validation sub-system may determine that the electronic message 418 obtained by the recipient 402 is authentic and valid. The cryptographic validation sub-system 412 may transmit, via the interface provided by the request processing sub-system 406, a notification to the recipient 402 to indicate that the electronic message 418 it has obtained is valid.

Figure 5:
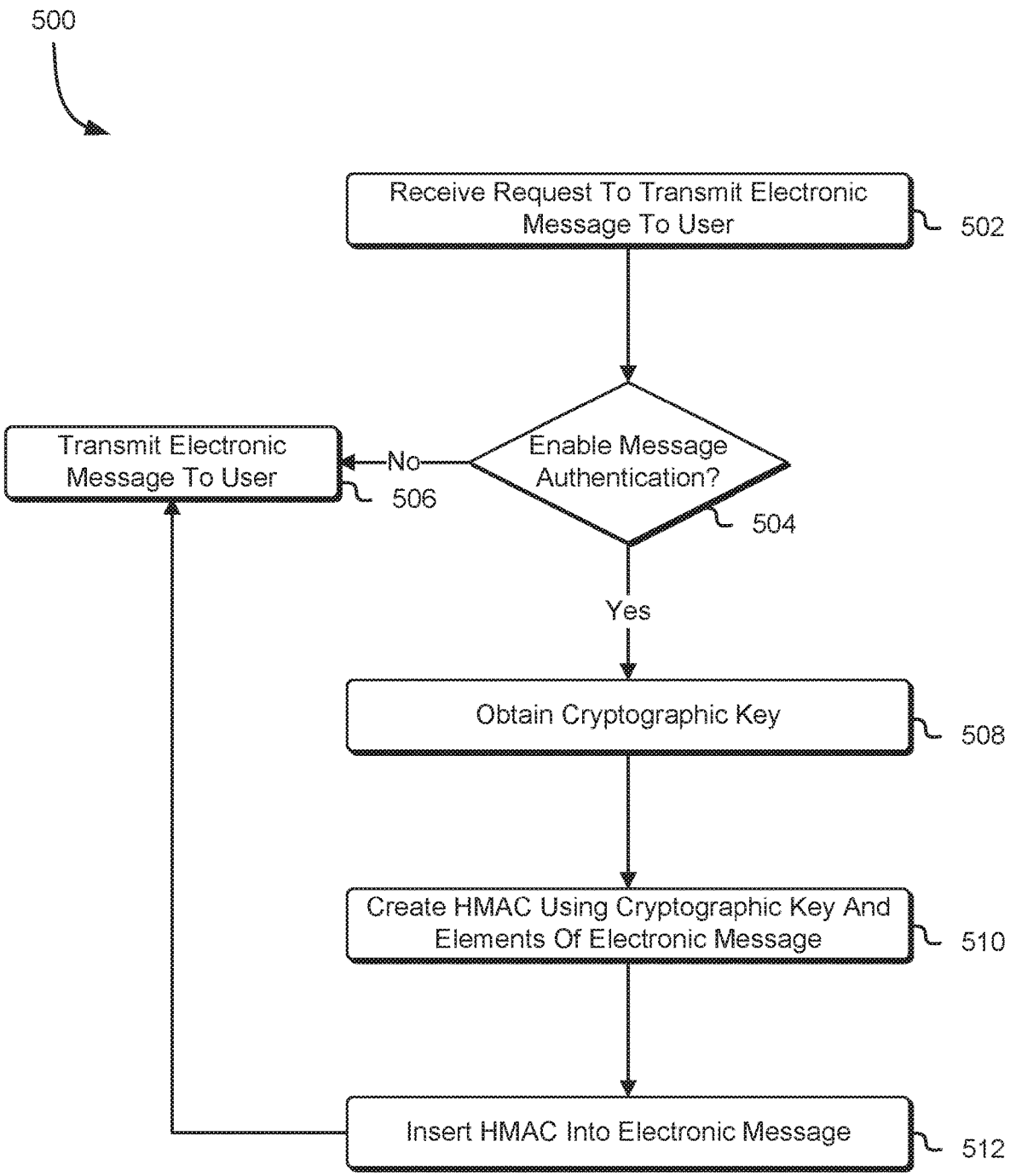
FIG. 5 shows an illustrative example of a process for generating a cryptographic code for inclusion in an electronic message to enable validation of the electronic message in accordance with at least one embodiment.

FIG. 5 shows an illustrative example of a process 500 for generating a cryptographic code for inclusion in an electronic message to enable validation of the electronic message in accordance with at least one embodiment. The process 500 may be performed by an electronic message delivery service, which may utilize a cryptographic operation sub-system described herein to generate cryptographic information that may be inserted into an electronic message. It should be noted that the cryptographic operation sub-system, while described extensively throughout the present disclosure, as being a sub-system (e.g., computer system, process, application, TPM/HSM of a computer system, etc.) of the electronic message delivery service, the cryptographic operation sub-system may serve as its own distinct service, as a sub-system within the organization of the author of the electronic message (e.g., on-premises computer system in a network distinct from the network of the electronic message delivery service, etc.). In some instances, the cryptographic operation sub-system is a computer system, or abstraction thereof, implemented using hardware and software of a key management service, which the electronic message delivery service may utilize to generate cryptographic information, such as HMACs.

At any time, an electronic message delivery service may receive 502 a request from an author of an electronic message to transmit the electronic message to a particular user. The electronic message may specify an electronic address of the user, as well as a subject of the electronic message and information that may be of interest to the user. The electronic message may be provided by the author via an interface of the electronic message delivery service. Alternatively, the author may generate the electronic message via the interface provided by the electronic message delivery service.

In response to the request, the electronic message delivery service may determine 504 whether to enable message authentication for the electronic message. For instance, via the interface, the author of the electronic message may request that an authentication mechanism be introduced in the electronic message to enable the recipient of the electronic message to validate the electronic message as having originated from the author and/or the electronic message delivery service. The electronic message delivery service may implement message authentication by default, without author input. Alternatively, the author may opt to have the electronic message without any authentication mechanisms introduced in the electronic message. Thus, if the electronic message delivery service determines that message authentication mechanisms are not enabled for the electronic message, the electronic message delivery service may transmit 506 the electronic message to the user in accordance with the electronic address of the user supplied by the author of the electronic message.

If the electronic message delivery service determines that message authentication is enabled for the electronic message, the electronic message delivery service may provide unencrypted information to the cryptographic operation sub-system to generate cryptographic information that can be inserted into the electronic message and that can be used by the recipient of the electronic message to validate the electronic message. For example, the electronic message delivery service may provide the recipient's electronic address and the subject of the electronic message to the cryptographic operation sub-system. Alternatively or additionally, the electronic message delivery service may provide a portion of the body of the electronic message for use in generating the cryptographic information.

In response to receiving the unencrypted information from the electronic message delivery service, the cryptographic operation sub-system may obtain 508 a cryptographic key that may be used, along with the unencrypted information, as input to a cryptographic hash function for creation of an HMAC or other cryptographic information. In an embodiment, the cryptographic operation sub-system generates a cryptographic key that is specific to the electronic message. Alternatively, the cryptographic operation sub-system may generate a cryptographic key that is specific to the recipient or to the author of the electronic message. In an embodiment, the cryptographic operation sub-system obtains the cryptographic key from a cryptographic key repository. The cryptographic key repository may maintain a cryptographic key for each customer of the electronic message delivery service, for each recipient of electronic messages delivered by the electronic message delivery service, or for the electronic message delivery service itself.

The cryptographic operation sub-system may use the unencrypted information and the cryptographic key as input for a cryptographic hash function to create 510 an HMAC, or other cryptographic information, that may be inserted into the electronic message. It should be noted that the operation 510 of the process 500 may alternatively be performed by a key management service or other service that maintains and manages cryptographic keys. For instance, the cryptographic operation sub-system may transmit a request to a key management service to generate the cryptographic information. This request may include the unencrypted information provided by the electronic message delivery service. The key management service may provide a response to the request that includes the cryptographic information and an identifier corresponding to the cryptographic key utilized by the key management service to generate the cryptographic information. In another embodiment, the cryptographic information may be provided by the author, which may maintain the cryptographic key utilized to create the cryptographic information.

The cryptographic operation sub-system may provide the HMAC or other cryptographic information to the electronic message delivery service, which may insert 512 the HMAC or other cryptographic information into the electronic message. For instance, the electronic message delivery service may insert the cryptographic information into the header of the electronic message. Additionally, or alternatively, the electronic message delivery service may insert the cryptographic information into the body of the electronic message, along with instructions for the recipient to enable the recipient to utilize the cryptographic information for validation of the electronic message. These instructions may include an electronic address of an electronic message validation service, which the recipient may use to forward the electronic message to the electronic message validation service for validation. Alternatively, these instructions may include a URI of the electronic message validation service, which the recipient may use to access the electronic message validation service and submit a request to the electronic message validation service to validate the electronic message. The electronic message delivery service may then transmit 506 the electronic message, including the cryptographic information and instructions for validating the electronic message, to the user to fulfill the request.

Figure 6:
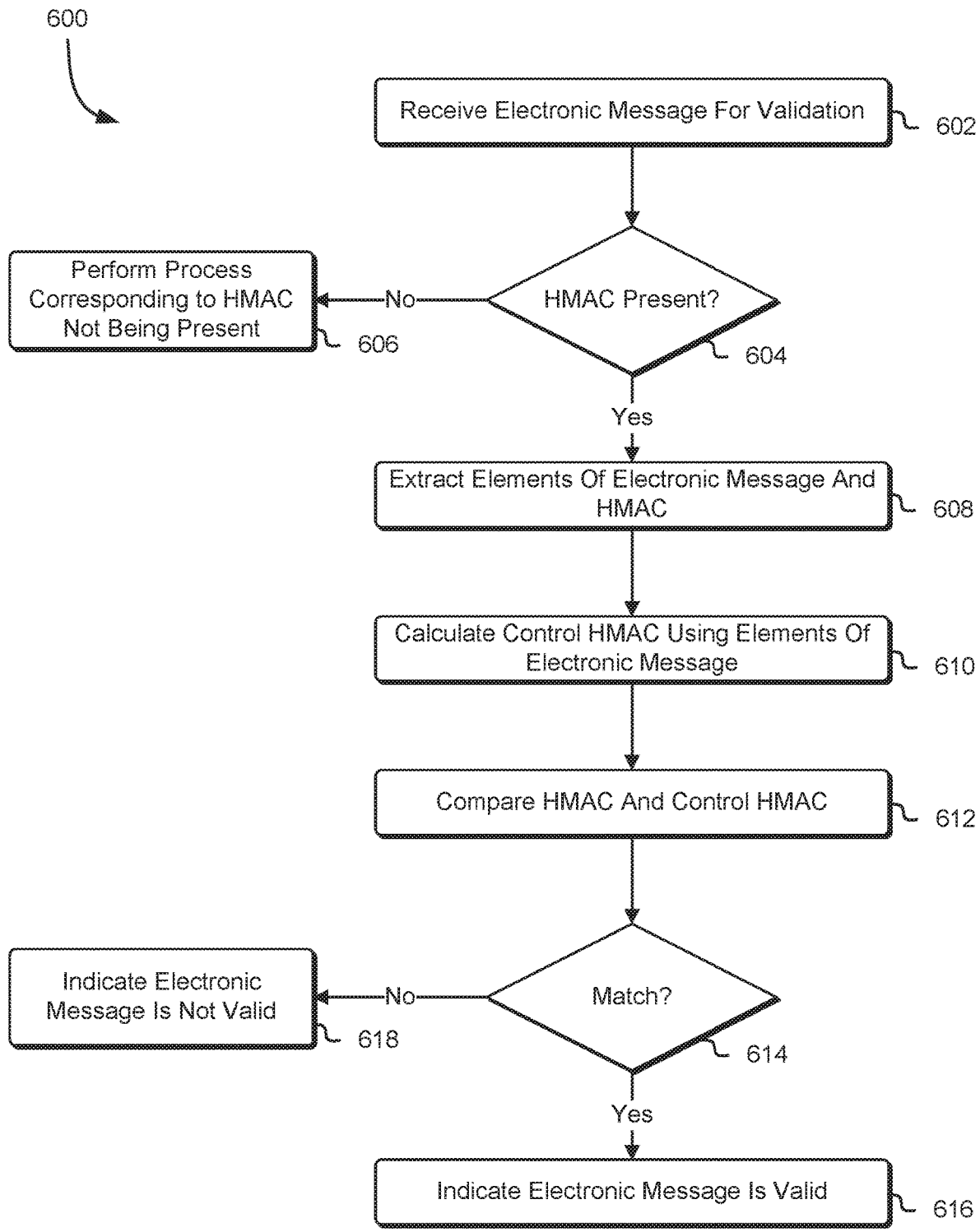
FIG. 6 shows an illustrative example of a process for evaluating an electronic message provided by a recipient of the electronic message to determine whether the electronic message originated from a valid source in accordance with at least one embodiment.

If the electronic message includes an electronic address of an electronic message validation service, the recipient of the electronic message may use the electronic address to forward the electronic message to the electronic message validation service. This electronic address may include the cryptographic information generated by the electronic message delivery service, as well as an identifier corresponding to the cryptographic key utilized to generate the cryptographic information. FIG. 6 shows an illustrative example of a process 600 for evaluating an electronic message provided by a recipient of the electronic message to determine whether the electronic message originated from a valid source in accordance with at least one embodiment. The process 600 may be performed by a computer system or abstraction thereof (such as one or more virtual machines operating via a hypervisor) of the electronic message validation service.

The electronic message validation service may receive 602 an electronic message from a recipient for validation of the electronic message. In response to receiving an electronic message from a recipient for validation of the electronic message, the electronic message validation service may evaluate the electronic message to determine 604 whether an HMAC or other cryptographic information is present in the electronic message. For instance, the electronic message validation service may evaluate the electronic address used by the recipient to transmit the electronic message to the electronic message validation service to determine whether the cryptographic information is encoded into the electronic address. Additionally, or alternatively, the electronic message validation service may evaluate the header and body of the electronic message to identify any cryptographic information that may specified therein. If the electronic message validation service determines that the electronic message does not include any cryptographic information, the electronic message validation service may perform 606 a process corresponding to an HMAC not being present in the electronic message. For instance, if electronic messages transmitted to the recipient included HMACs for authentication of these electronic messages, the electronic message validation service may determine that the electronic message is not valid. In some embodiments, if the electronic message is not valid, the electronic message validation service transmits a notification to a security service to indicate that a recipient has received an invalid electronic message. This may cause the security service to perform remedial actions to identify any malicious entities that may have transmitted the invalid electronic message to the recipient. Alternatively, if the electronic message provided for validation was originally transmitted without an HMAC, the electronic message validation service may perform other operations to validate the electronic message. This may include verifying that a timestamp of the electronic message corresponds to a time at which the electronic message was transmitted by the electronic message delivery service to the recipient or to another message delivery service or service.

If the electronic message validation service determines that the electronic message includes cryptographic information, the electronic message validation service may extract 608 one or more elements from the electronic message and the cryptographic information for evaluation. These one or more elements may include an electronic address of the recipient, the subject of the electronic message, portions of the body of the electronic message, an identifier corresponding to a cryptographic key, a timestamp of the electronic message (e.g., time at which electronic message was transmitted to the recipient, etc.), or any combination thereof. These one or more elements may correspond to inputs for a cryptographic hash function for creation of the cryptographic information specified in the electronic message. Using this information, the electronic message validation service may identify the cryptographic key utilized to generate the cryptographic information.

Using the cryptographic key and the one or more elements extracted from the electronic message, the electronic message validation service may calculate 610 a control HMAC or other control cryptographic information. For instance, the electronic message validation service may use the one or more elements and the cryptographic key as input for a cryptographic hash function to generate the control HMAC or other control cryptographic information. The electronic message validation service may compare 612 the control HMAC or other control cryptographic information to the cryptographic information from the electronic message to determine 614 whether there is a match.

If the electronic message validation service determines that the cryptographic information extracted from the electronic message does not match the control cryptographic information generated by the electronic message validation service, the electronic message validation service may determine that the electronic message is not valid. As a result of this determination, the electronic message validation service may transmit a notification to the recipient to indicate 618 that the electronic message is not valid. Further, the electronic message validation service may transmit a notification to a security service to indicate that a recipient has received an invalid electronic message. However, if the electronic message validation service determines that the cryptographic information extracted from the electronic message matches the control cryptographic information generated by the electronic message validation service, the electronic message validation service determines that the electronic message is valid. The electronic message validation service may transmit a notification to the recipient to indicate 616 that the electronic message is valid and safe for use.

Figure 7:
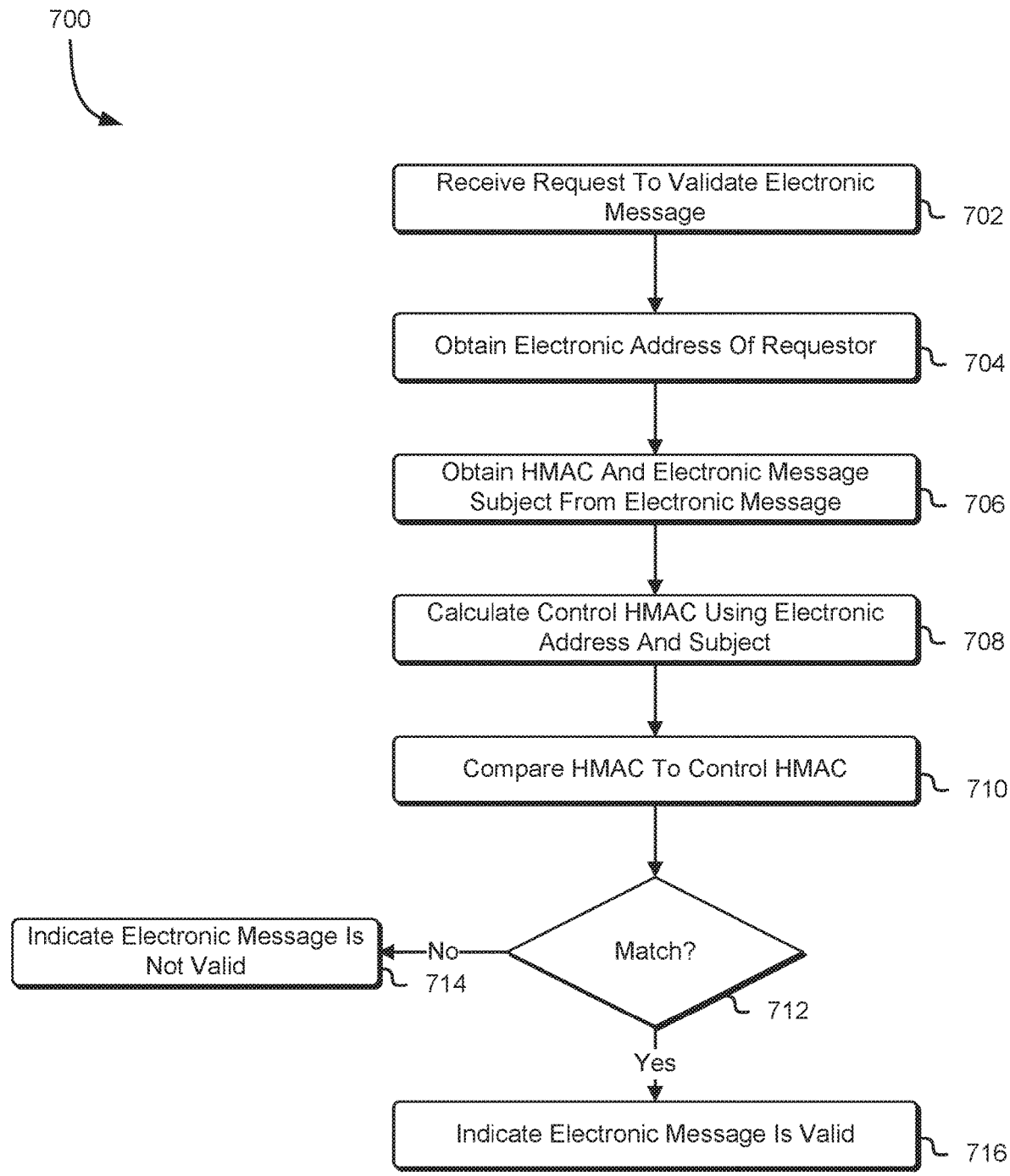
FIG. 7 shows an illustrative example of a process for validating an electronic message received by a recipient using information and a cryptographic code from the electronic message provided by the recipient in accordance with at least one embodiment.

As noted above, the electronic message delivery service may insert a URI of the electronic message validation service into the electronic message to enable a recipient of the electronic message to access the electronic message validation service and request validation of the electronic message without providing the entirety of the electronic message. The electronic message validation service may provide, to the recipient, an interface through which the recipient may submit its request to validate the electronic message. Accordingly, FIG. 7 shows an illustrative example of a process 700 for validating an electronic message received by a recipient using information and a cryptographic code from the electronic message provided by the recipient in accordance with at least one embodiment. The process 700 may be performed by a computer system or abstraction thereof (such as one or more virtual machines operating via a hypervisor) of the electronic message validation service.

Through the interface provided by the electronic message validation service, a recipient may submit a request to the electronic message validation service. The electronic message validation service may receive 702 this request from the recipient and, through the interface, prompt the recipient to provide the recipient's electronic address or other information usable to identify the electronic message that the recipient wishes to have validated. For example, through the interface, the electronic message validation service may prompt the recipient to provide a username of the recipient. This username may be an electronic address of the recipient.

The electronic message validation service may obtain 704, through the interface, the electronic address of the recipient. As described above, the username provided by the recipient may be the recipient's electronic address. Alternatively, the electronic message validation service may prompt the recipient, via the interface, to provide the electronic address to which the electronic message was delivered. In an embodiment, the electronic message validation service utilizes the information provided by the recipient to identify a log of electronic messages delivered to the recipient. Through this log, the electronic address validation service may obtain the recipient's electronic address.

The electronic message validation service may also obtain 706 the HMAC or other cryptographic information and the subject of the electronic message from the electronic message. For instance, the electronic message validation service may prompt the recipient, via the interface, to provide the cryptographic information and the subject of the electronic message from the electronic message. The recipient may utilize the interface to transmit the cryptographic information and subject of the electronic message. Alternatively, the electronic message validation service may query the log described above to identify the electronic message transmitted to the recipient that is to be validated. For instance, if the recipient provides a timestamp corresponding to a time at which the electronic message was transmitted to the recipient, the electronic message validation service may use this timestamp to identify, in the log, an electronic message corresponding to this timestamp. From this electronic message, the electronic message validation service may extract the cryptographic information and the subject of the electronic message. It should be noted that while the subject of the electronic message is used extensively throughout the present disclosure for the purpose of illustration, other elements may be extracted from the electronic message (e.g., portions of the body, portions of the header, timestamp corresponding to a time at which the electronic message was generated, etc.).

Similar to the process 600 described above in connection with FIG. 6, the electronic message validation service may use information from the electronic message either provided by the recipient or garnered from the log to identify the cryptographic key utilized to generate the cryptographic information. The electronic message validation service may use the cryptographic key and the one or more elements extracted from the electronic message to calculate 708 a control HMAC or other control cryptographic information. The electronic message validation service may compare 710 the control HMAC or other control cryptographic information to the cryptographic information from the electronic message to determine 712 whether there is a match. If the electronic message validation service determines that the cryptographic information provided by the recipient does not match the control cryptographic information generated by the electronic message validation service, the electronic message validation service may determine that the electronic message is not valid. As a result of this determination, the electronic message validation service may transmit a notification to the recipient to indicate 714 that the electronic message is not valid. However, if the electronic message validation service determines that the cryptographic information provided by the recipient matches the control cryptographic information generated by the electronic message validation service, the electronic message validation service determines that the electronic message is valid. The electronic message validation service may transmit a notification to the recipient to indicate 716 that the electronic message is valid.

Figure 8:
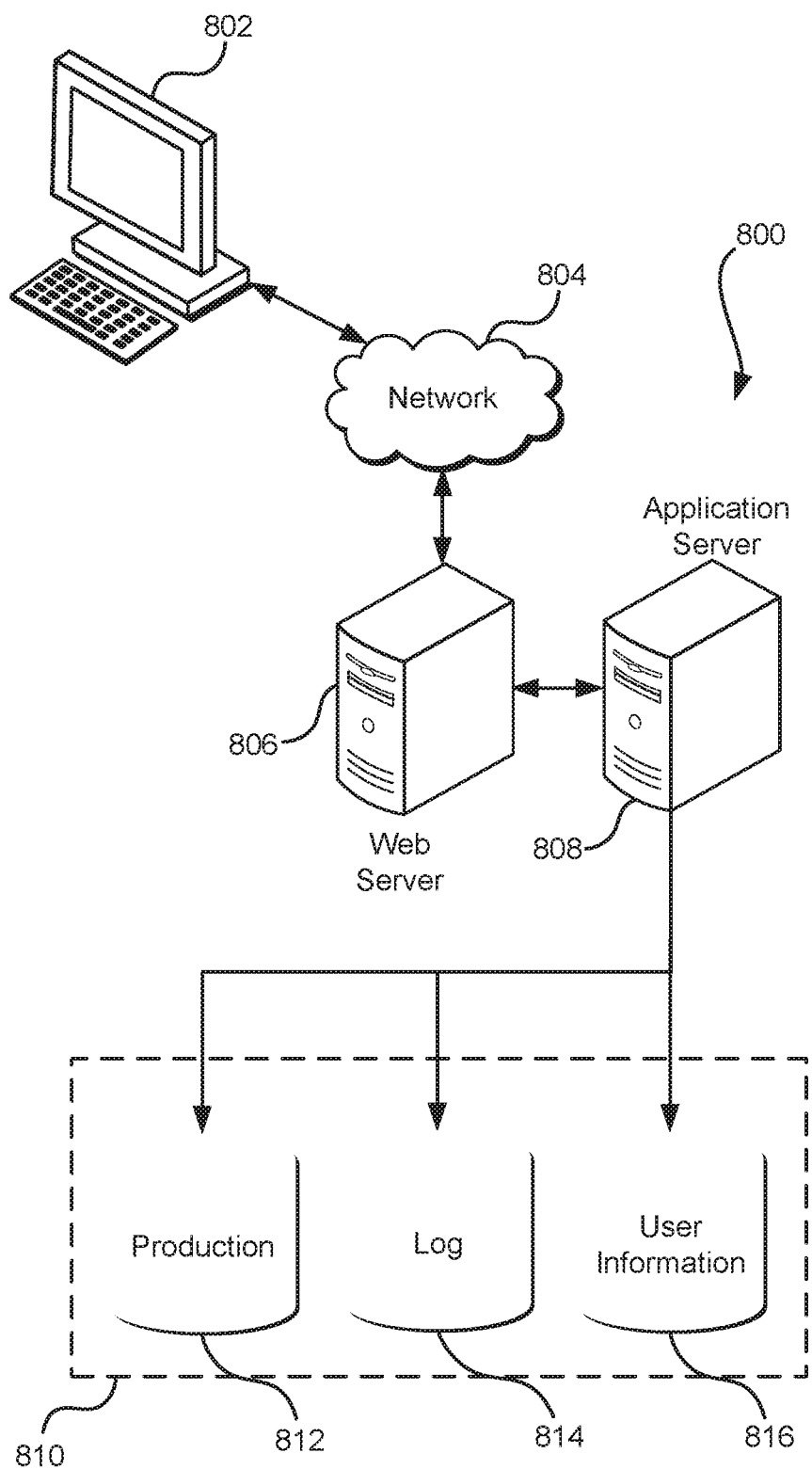
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    at a first computing entity that obtains, from a second computing entity, a first electronic message addressed to a recipient:
        determining, based at least in part on the first electronic message addressed to the recipient, first information from the first electronic message usable to uniquely identify the first electronic message;
        generating, based at least in part on the first information, a cryptographic key, and a cryptographic hash function, a message authentication code;
        inserting, into the first electronic message, the message authentication code, an identifier of the cryptographic key, and second information usable to identify an electronic message validation service to which the cryptographic information is to be provided to validate at least a portion of the first electronic message with the identifier and the message authentication code, thereby generating a second electronic message; and
    providing the second electronic message to the recipient, on a third computing entity, indicated in the first electronic message to cause the recipient to validate the second electronic message.

2. The computer-implemented method of claim 1, wherein the first information from the first electronic message includes at least an electronic address of the recipient and a subject of the first electronic message.

3. The computer-implemented method of claim 1, wherein the second information includes at least an electronic address of a computer system that is usable to validate the portion of the first electronic message specifying the identifier and the message authentication code.

4. The computer-implemented method of claim 1, wherein the message authentication code, the identifier of the cryptographic key, and the second information are inserted into a header of the electronic message and into a portion of a body of the electronic message.

5. A first system, comprising at least one computing device to implement one or more services, wherein the one or more services:
    determine, based at least in part on a request to transmit a first electronic message, generated by a second system, that is addressed to a recipient, first information from the first electronic message usable to uniquely identify the first electronic message;
    obtain, based at least in part on the first information and a cryptographic key, cryptographic information;
    insert, into the first electronic message, the cryptographic information and second information usable to identify an electronic message validation service to which the cryptographic information is to be provided to validate at least a portion of the first electronic message with the cryptographic information, thereby generating a second electronic message, the second information including executable code which, as a result of execution by the recipient, causes the second electronic message to be validated by the electronic message validation service; and transmit the second electronic message to the recipient.

6. The system of claim 5, wherein:
the cryptographic information is a keyed-hash message authentication code; and
the one or more services further utilize the cryptographic key and the first information as input to a cryptographic hash function to obtain the keyed-hash message authentication code.

7. The system of claim 5, wherein the second information includes an identifier of the cryptographic key to cause identification, by the electronic message validation service, of the cryptographic key to cause an evaluation of the cryptographic information.

8. The system of claim 5, wherein the second information includes a Uniform Resource Identifier of a computer system of the electronic message validation service, whereby the computer system utilizes the cryptographic key and the first information to generate control cryptographic information usable to validate the cryptographic information.

9. The system of claim 5, wherein the second information includes an electronic address of a computer system of the electronic message validation service, whereby:
the computer system utilizes the cryptographic key and the first information to generate control cryptographic information usable to validate the cryptographic information; and
the electronic address includes the cryptographic information.

10. The system of claim 5, wherein the first information includes at least an electronic address of the recipient and a timestamp of the first message, the timestamp corresponding to a time at which the first message was created, a portion of the first electronic message, and an indication of the portion of the first electronic message.

11. The system of claim 5, wherein the one or more services, to obtain the cryptographic information, transmit the first information to a key management system to cause the key management system to:
provision the cryptographic key;
utilize the first information and the cryptographic key to generate the cryptographic information; and
provide the cryptographic information.

12. The system of claim 5, wherein the one or more services further:
generate, in response to the request, the cryptographic key; and
utilize the cryptographic key and the first information as input to a cryptographic function to obtain the cryptographic information.

13. A non-transitory computer-readable storage medium having stored thereon executable instructions that, as a result of being executed by one or more processors of a first computer system, cause the first computer system to at least:
determine, based at least in part on a request to transmit a first electronic message to a recipient, first information from the first electronic message usable to uniquely identify the first electronic message, wherein the first electronic message is generated by a second computer system;
obtain, based at least in part on the first information and a cryptographic key, cryptographic information;

insert, into the first electronic message, the cryptographic information and second information usable to identify an electronic message validation service to which the cryptographic information is to be provided to validate at least a portion of the first electronic message with the cryptographic information, thereby generating a second electronic message; and provide the second electronic message to the recipient on a third computer system.

14. The non-transitory computer-readable storage medium of claim 13, wherein the cryptographic information is inserted into a header portion of the electronic message.

15. The non-transitory computer-readable storage medium of claim 13, wherein the second information includes second executable instructions that, as a result of being executed by one or more processors of a second computer system, cause the second computer system to transmit the cryptographic information and the first information to the electronic message validation service to cause the electronic message validation service to validate the portion of the first electronic message.

16. The non-transitory computer-readable storage medium of claim 13, wherein the instructions that cause the computer system to obtain the cryptographic information further cause the computer system to:
transmit a second request to a key management computer system to cause the key management computer system to provision the cryptographic key and generate the cryptographic information, the second request including the first information; and
receive, from the key management computer system, the cryptographic information and an identifier of the cryptographic key.

17. The non-transitory computer-readable storage medium of claim 13, wherein the instructions that cause the computer system to obtain the cryptographic information further cause the computer system to:
generate, in response to the request, the cryptographic key; and
utilize the first information and the cryptographic key to generate the cryptographic information.

18. The computer-implemented method of claim 1, wherein the recipient validates the second electronic message using the electronic message validation service.

19. The non-transitory computer-readable storage medium of claim 13, wherein the first information includes an electronic address of the recipient and at least a portion of a body of the electronic message, the electronic address of the recipient including a mailbox, a domain, and the cryptographic information, the cryptographic information separated from the mailbox and the domain by a special character.

20. The non-transitory computer-readable storage medium of claim 13, wherein the second information includes an electronic address of the electronic message validation service, the electronic address specifying the cryptographic information and an identifier of the cryptographic key.

* * * * *